(12) United States Patent  
Villaret

(10) Patent No.: US 6,222,338 B1
(45) Date of Patent: Apr. 24, 2001

(54) METHOD AND APPARATUS FOR THE DIRECT TEACHING OF AUTOMATIC MACHINES

(75) Inventor: Yves Villaret, Hadera (IL)

(73) Assignee: Eshed Robotec, Tel Aviv (IL)

( * ) Notice: Subject to any disclaimer, the term of this patent is extended or adjusted under 35 U.S.C. 154(b) by 0 days.

(21) Appl. No.: 09/443,805

(22) Filed: Nov. 19, 1999

Related U.S. Application Data

(63) Continuation of application No. PCT/IL98/00163, filed on Apr. 2, 1998.

(30) Foreign Application Priority Data

May 22, 1997 (IL) .................................................. 120889

(51) Int. Cl.[7] .................................................. G05B 19/42
(52) U.S. Cl. ..................... 318/568.13; 318/567; 901/4; 700/261
(58) Field of Search ..................... 318/567, 568.11, 318/568.1, 568.12, 568.13, 568.14, 568.15, 568.16, 568.17, 568.18, 568.19; 701/3, 4, 5; 700/245, 261, 264

(56) References Cited

U.S. PATENT DOCUMENTS

| 3,920,972 | 11/1975 | Corwin, Jr. et al. ............ 235/151.11 |
| 4,408,286 | 10/1983 | Kikuchi et al. ...................... 364/513 |
| 4,442,387 | 4/1984 | Lindbom .............................. 318/568 |
| 4,506,335 | * 3/1985 | Magnuson ............................. 364/513 |
| 4,737,697 | 4/1988 | Maruo et al. ........................ 318/568 |
| 4,757,459 | 7/1988 | Lauchnor et al. ................... 364/513 |
| 4,801,856 | * 1/1989 | Wajima ................................. 318/568 |
| 4,864,206 | * 9/1989 | Onaga et al. .................... 318/568.11 |
| 4,883,938 | * 11/1989 | Sarugaku ........................ 219/124.34 |
| 4,984,175 | * 1/1991 | Toyoda et al. ....................... 364/513 |
| 5,021,970 | 6/1991 | Mohri et al. ......................... 364/513 |
| 5,025,393 | 6/1991 | Naito ................................... 364/513 |
| 5,051,675 | 9/1991 | Okumura et al. ................. 318/568.1 |
| 5,091,683 | * 2/1992 | Shimada .............................. 318/561 |
| 5,103,149 | 4/1992 | Kimura et al. .................... 318/568.1 |
| 5,155,423 | * 10/1992 | Karlen et al. ................... 318/568.11 |
| 5,331,264 | * 7/1994 | Cheng et al. .................... 318/568.11 |
| 5,363,474 | 11/1994 | Sarugaku et al. ..................... 395/91 |
| 5,363,475 | 11/1994 | Baker et al. .......................... 395/122 |
| 5,509,847 | * 4/1996 | Jinno et al. ............................ 451/11 |
| 5,587,635 | * 12/1996 | Watanabe et al. .................... 318/434 |
| 6,124,693 | * 9/2000 | Okanda et al. ................. 318/568.11 |

FOREIGN PATENT DOCUMENTS

| 0 328 650 | 8/1989 | (EP) . |
| 92/03769 | 3/1992 | (WO) . |

\* cited by examiner

Primary Examiner—Jeffrey Donels
Assistant Examiner—Rina I. Duda
(74) Attorney, Agent, or Firm—Altera Law Group, LLC

(57) ABSTRACT

A method for the direct teaching of automatic machinery systems, comprising a plurality of arms and of corresponding actuators for equilibrating the arms against payloads and displacing them to operative positions, when desired, which comprises the steps of: (a) placing the system in a reference configuration, equilibrating its arms, and memorizing for each arm the reference torque to be produced by the corresponding motor to maintain the arm in its reference position; (b) when it is wished to carry out the teaching, placing the system in the Teach mode; (c) applying an external force to an arm of the system in the direction desired for the purpose of the teaching; (d) for each arm, determining the actual torque required to maintain the arm in its reference position in spite of the application of said operator force; (e) calculating a displacement torque as the difference between said reference and said actual torque; (f) causing the motor to displace the arm in the direction of said displacement torque and by an amount proportional to it; and (g) repeating the above operations c to f by the successive application of external forces, until the position of the arm, that it is desired to teach, has been reached.

12 Claims, 4 Drawing Sheets

US 6,222,338 B1

METHOD AND APPARATUS FOR THE DIRECT TEACHING OF AUTOMATIC MACHINES

This application is a continuation of international application serial number PCT/IL98/00163, filed Apr. 2, 1998, which claims priority from Israeli application No. 120889 filed May 22, 1997, both of which are incorporated herein by reference.

FIELD OF THE INVENTION

This invention relates to a method and apparatus for programming an automatic machine, particularly but not exclusively a robot, and more particularly, for teaching a robot the operative positions and orientations of the robot manipulator arm, by a direct teaching method

BACKGROUND OF THE INVENTION

Computer operation of robots must be programmed by teaching them a cycle of operations and the positions and orientations in which the manipulator arm, which supports the tools for carrying out the desired operations and places them in the appropriate positions, carries out each operation. In view of the importance of teaching the robot in a precise manner and without excessive effort on the part of the operator, and further, of avoiding possible damages or danger resulting from unpredictable reactions of the robot, various methods have been developed in the art. One method involves guiding the robot indirectly by means of a pendant, which may comprise, e.g., three position control buttons and three orientation control buttons. Commands are given by means of the pendant and are fed into a computer to command movement of the arm by coordinate extrapolation and transformation. As soon as an operative position or orientation is reached, the position and orientation of the end of the robot arm in a coordinate system, which may be Cartesian or cylindrical, are memorized and become part of a program. The computer calculates a path between the points in the program. Instructions regarding the operations to be carried out at each point so defined and memorized, are separately given. Inventions of this kind are described, for instance, in U.S. Pat. Nos. 3,920,972 and 4,757,459.

Another method of teaching is the so-called "direct" teaching, in which the operator directly leads the end of the manipulator arm to the desired locations and the coordinates of said locations are memorized Direct teaching is described, for instance, in U.S. Pat. Nos. 5,051,675, 5,103,149 and. 5,363,475. U.S. Pat. No. 5,051,675 discloses a system in which the power lines for the electric motors driving the moving arm are cut off in the teaching mode. U.S. Pat. No. 5,103,149 discloses breaking means provided in the servo driver for breaking a current generated by the electric motor when the motor is rotated in response to the teaching operation, so as not to flow into the servo driver, to reduce the force which the instructor must use to move the robot arm during teaching. U.S. Pat. No. 5,363,474 discloses a system for controlling industrial robots which comprises sensor means for detecting the amount of external force applied from the forward end of the manipulator arm, means for controlling a driving force of said arm in accordance with the amount of external force detected by said sensor means, and emergency cut-off means for cutting off the supply of said driving force in an emergency.

All of the above systems, however, are not fully satisfactory. Either they do not reduce the force to be exerted by the instructor or reduce it only to an insufficient degree, and/or they render the servo system totally or partially inactive during teaching, which is undesirable and may even be dangerous, and/or they require complicated and expensive mechanisms. Further, generally they do not permit to position the robot arm with complete accuracy, so that the memorized coordinates are often inaccurate. This is due to the facts that: a) if the motors are left inactive, the operator must equilibrate by his own effort the arm and payload weights—if he discontinues this effort, the arms or the whole robot may collapse and thus cause a danger; b) the friction of the gears, and particularly the transition from static to dynamic friction, makes it more difficult to move the arms precisely.

This invention has the purpose of eliminating the defects of the prior art robot teaching methods and apparatus, and to provide a direct teaching method and apparatus that is simple, permits to reach the desired positions and orientations with absolute accuracy, does not require the introduction of complicated and/or expensive structural components in the robot, reduces the operator's effort and eliminates any possibility of danger to him.

SUMMARY OF THE INVENTION

It should be understood that the invention applies to any automatic machine or automatic mechanical system that can be "taught", viz. programmed to carry out a desired series of work stages by defining a succession of geometric stages, generally defined by positions and orientations, and a series of operations to be carried out in said geometric stages. However, for the sake of illustration, reference will be made to robots, which are typical automatic machines to which the invention is applicable. Robots are constituted by a plurality of elements, hereinafter generally "arms", that are connected to one another, generally by pivots, to form a kinematic chain. They have, among others, the following three features: 1—They comprise actuators—"actuator" meaning herein an electrical motor which can cause relative motion of two arms, generally about the pivot joining them—which actuators produce torques that can be calculated from the variables of the robot control loop; 2—Their mechanical system is reversible, viz. if a load is applied to an arm, it can be sensed on the corresponding actuator; 3—The mechanical model and mechanical equations of the robot system are known. This invention can be applied not only to robots, but to any automatic machine that has the same three features, with modifications (if any) that persons skilled in the art will have no difficulty in understanding. Examples of such machines are: a) cranes for heavy material handling, wherein a servo system will keep the payload still, until the Direct Teach system of the invention is activated by the user, and allows to balance the payload without effort; b) laser cutting machines, wherein a metal sheet is placed on a table driven by a servo system, and the positions and points of the cutting trajectory can be taught using the Direct Teach system of the invention.

Furthermore, this invention, though mainly directed to the teaching process, has applications in other phases of operation of robots or other machines, as will be explained hereinafter.

The teaching method according to the invention, as applied to a system that comprises a number of relatively movable elements (hereinafter "arms") and of actuators for holding said elements in a given position against payloads and moving them to operative positions, whenever desired, essentially comprises the steps of:

a—placing the system in a configuration, that will be called "the reference or starting configuration", equilibrating its arms, and memorizing for each arm what will be called "the reference torque", viz. the equilibrating torque that must be produced by the corresponding motor to maintain the arm in its reference position, viz. in its position in the reference configuration of the system;

b—when it is wished to carry out the teaching, placing the system in the Teach mode;

c—manually applying an external force to an arm of the system in the direction desired for the purpose of the teaching;

d—for each arm, determining what will be called "the actual torque", viz. the torque that would have to be applied by the motor, according to the mechanical equations of the system, to maintain the arm in its reference position in spite of the application of said external force;

e—calculating what will be called "the displacement torque", viz. the difference between said reference and said actual torque;

f—causing the motor to displace the arm in the direction of said displacement torque and by an amount proportional to it; and g—repeating the above operations c- to f- by the successive application of an external force, until the position that it is desired to teach has been reached.

Thereafter, the system is placed in the Record mode and the taught position is memorized.

In particular, the system is a robot and, more particularly, the arm that to which the external forces are applied is the manipulator arm.

It will be understood that in a system of the kind considered, e.g. in a robot, the displacement of an arm generally produces displacements of other, sometimes of all, arms, due to the kinematic connections therebetween. Therefore the calculation of the actual and of the displacement torque and the displacement of the arm proportionally to this latter occur concurrently for all the arms, although the external forces are applied to one arm only.

For a complete understanding of the invention, some facts, which are well known to skilled persons, regarding the operation of typical robots, should be recalled.

A typical robot comprises a number of movable arms which are controlled by motors, typically by means of reduction gears and a position feedback sensors. A Main Controller—a CPU—determines the position of each arm and its displacement, when desired, from one position to another, by issuing a corresponding "command position" ("command position" is the expression by which a command to assume a position is commonly designated in the art and will be designated hereinafter). The typical robot also includes a Servo Controller (hereinafter, briefly, "SC"), which is an electronic system that controls the movements of the arms, by controlling the current supplied to the actuators. The Main Controller sends its command positions to the SC, which executes them by varying the current supplied to the actuators. Further, when a force is applied to an arm which would tend to move it from its position as fixed by the Main Controller, the SC is capable of compensating such a force and maintaining the arm in said position by providing an equilibrating torque to the arm through an appropriate change of the current provided to the corresponding motor. The Main Controller and the SC are present in a robot according to the invention as in the standard robots, although part of their software may be included in the MTOC to be described hereinafter.

However, in addition to the aforesaid standard devices, a Manual Teaching Operation Controller, hereinafter "MTOC", is provided in a robot according to the invention. The MTOC is an electronic system, that can be included in the SC or can be external to it and use some communication means to interface with SC. When the system has been switched to the Teach mode, the MTOC is capable of sensing any change in the torque applied to each motor, and therefore in the current fed to it, in order to compensate for any external force applied to the corresponding arm, to translate said change to a proportional displacement, and to send a command to the Main Controller to activate, through one or more motors, a new command position which is different from the previous command position by the said displacement. In order to determine the sign or direction of the displacement torque, to which the arm displacement is proportional, it is to be noted that said torque is equal to the reference torque minus the actual torque.

When the robot is not carrying out any work, it should be maintained in an equilibrium condition. Even then, it is subjected to payloads, at least to the weight of its various parts, and if no current were fed to the motors, the arms would be free to move according to any degree of liberty permitted by each joint (e.g., one degree of liberty for a pivot, three degrees of liberty for a universal joint, and so on), and—one might say—the robot would collapse. However, sufficient current is fed by the actuators controlled by the SC, to produce equilibrating torques which prevent motion of the arms about their joints. The relationship between the payloads and the torques is determined by the mechanic equations of the system, which, in the system of the invention, are included in the software of the MTOC.

The MTOC comprises a software that calculates the payloads using a) as input values, the actual torques outputted by the SC in order to equilibrate payloads and arms; b) the mechanical equations of the system. This software is activated continuously before starting a Direct Teach session, so that payload values are always ready and available when the Teach mode is activated.

Now, in the process of the invention, the robot is initially placed in the reference configuration, wherein it is in equilibrium and all actuator outputs are such as will balance the payloads. When the teaching starts, the operator will place the robot in the Teach mode, usually by operating a switch, as will be hereinafter explained. At this moment, the last values of the payloads, which has been calculated before the Teach mode is started—the "reference values of the payloads"—are memorized in the MTOC software. The operator then manually applies an external force to an arm, generally the manipulator arm, which tends to displace said arm in a desired direction, and generally other arms as well, due to the kinematic connections between arms. The SC would act, when the robot is in a static configuration, to equilibrate the additional payloads and maintain the arm in its position, by changing the torque applied by the respective motor according to the mechanical equations of the system. According to the invention, it will transmit to the MTOC the values of the torque—the "actual torque"—that would maintain said arm in its position, and the MTOC will calculate the displacement torque and the corresponding displacement and request from the Main Controller a new command position differing from the previous one by said displacement. This will occur for each arm and each degree of liberty affected by the application of the external force. Let us consider a single degree of liberty, e.g. a rotation about a single pivot. To prevent a displacement according to said degree of liberty, e.g. a rotation about said pivot, a change in the output of the actuator which controls said degree of liberty would be required. The torque that would be generated by said motor, if the change had been effected, is the actual torque. The difference between the reference torque, which existed when the system was in its reference configuration and which has been memorized, and the actual torque, represents the displacement torque. Now, the MTOC send to the SC a request to change the command position in the direction of said displacement torque and to an amount proportional to said torque, with the additional of an acceleration compensation, as hereinafter explained, and, as the result of the new command position, the arm will be displaced in the direction determined by the force applied by the operator and by an amount corresponding to it. However, after this displacement, the operator will still apply a force to the arm and the same actions will be repeated, leading to a further change in the command position and a further arm displacement; and so on. When the arm has reached the final position desired by the operator, this latter will cease to apply to apply a force to it, the command position will no longer be changed, and the arm will remain in equilibrium in said final position. The motion of the arm will therefore occur by increments, but these are so small that they are not sensed by the operator and the arm appears to move continuously from its reference position in the direction in which the operator pushes it. Of course, what has been said about one degree of liberty of an arm applies to all degrees of liberties of all arms that are kinematically connected and concurrently influenced by the force applied by the operator e.g. to the manipulator arm.

The invention consequently includes and apparatus for the direct teaching of automatic machinery systems comprising a plurality of arms and of corresponding actuators for equilibrating the arms against payloads and displacing them to operative positions, when desired, and further comprising a Main Controller and an SC, characterized in that it additionally comprises means for placing the system in a Teach mode and a MTOC, which MTOC comprises means for reading from the system memory the reference torques, for receiving from the SC, when an external force is applied to an arm, the value the actual torque required to maintain the arm in its reference position in spite of said force, means for calculating the displacement torque and the corresponding displacement, and means for requesting from the SC a new command position differing from the previous one by an amount proportional to and having the direction of said displacement torque.

DETAILED DESCRIPTION OF PREFERRED EMBODIMENTS

Figure 1:
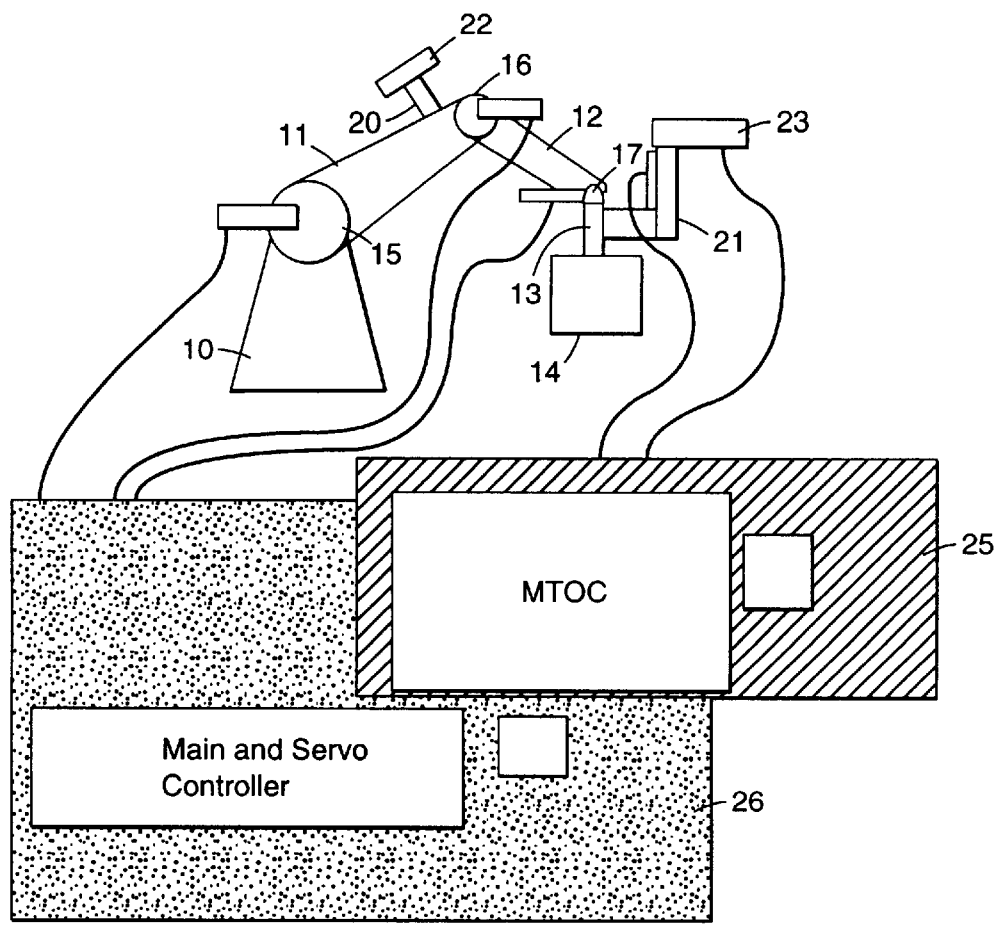
FIG. 1 is a generic, schematic illustration of a robot to which the invention is applied.

FIG. 1 schematically illustrates a robot embodying the invention. The robot schematically illustrated therein has only three arms, 11, 12 and 13, fixed on a base 10. Arm 13 is rotatable about arm 12, arm 12 is rotatable about arm 11 and arm 11 is rotatable about base 10 through pivot connections. A payload 14 is applied to arm 13. Motors 15, 16 and 17 control the relative motions of the arms. In order to carry out the invention, handles 20 and 21 are fixed to arms 11 and 13 respectively, and are actuated by the operator. Switches 22 and 23, actuatable by the operator, are respectively connected to the MTOC 25, which is connected by an interface or is integrated with the Main Controller and SC 26, which in themselves are conventional components, and which, for the sake of simplicity, are indicated in the drawing as one block. Dead Man switch 23, when actuated, places the robot in the Teach mode, while the switch 24 causes the positions of the robot arms to be recorded.

Figure 2:
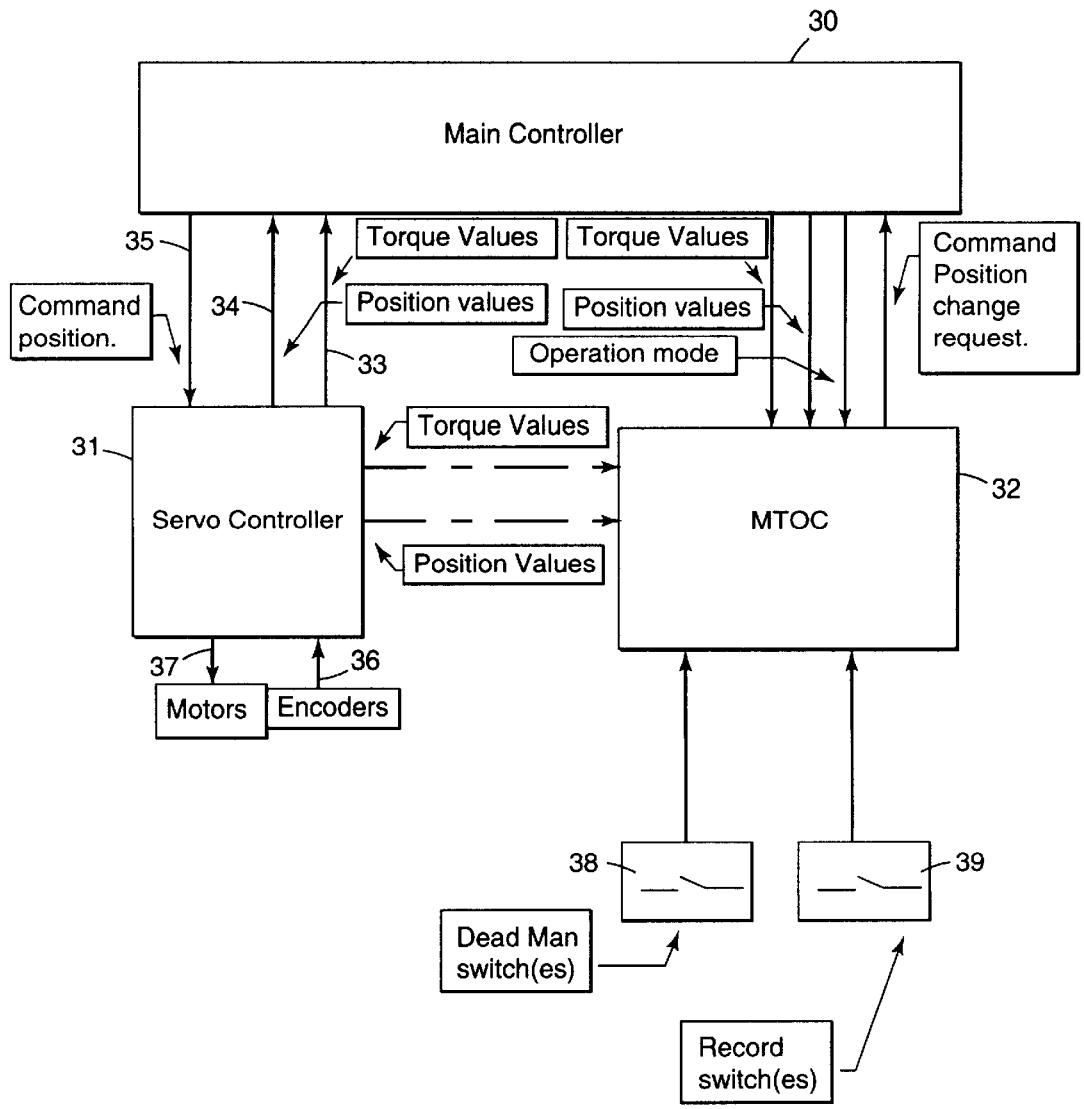
FIG. 2 is a block diagram schematically illustrating the electronic components of a robot according to an embodiment of the invention.

FIG. 2 is a block diagram generally illustrating the electronic apparatus which controls the robot according to an embodiment of the invention. The Main Controller 30 and the SC 31 are essentially the same as in standard robots, while the MTOC 32 is added in the apparatus according to the invention. In ordinary operation, not in the Teach mode, the SC transmits torque values and position values at 33 and 34 respectively to the Main Controller and receives from it command positions at 35. The SC receives input from the encoders at 36 and outputs current values to the motors at 37.

When the teaching operation is to be carried out, a Dead Man switch or a plurality of such switches 38 is actuated and the MTOC begins to operate, without interfering with the normal operative capacities of the Main Controller and of the SC.

Now, torque and position values are transmitted from the Main Controller to the MTOC. The Main Controller compares reference and actual torques, in the way described in the Summary of the Invention, to determine the torque corresponding to the operator's action and the corresponding required position change, and transmits to the Main Controller a request to effect the corresponding command position change. In a variant of the above described operation, position values may be transferred directly from the SC to the MTOC, this being indicated in broken lines in the diagram. Once the robot arms have reached the desired position, the Teaching process is terminated by operating a record switch or switches 39 to cause the said positions to be memorized.

Figure 3:
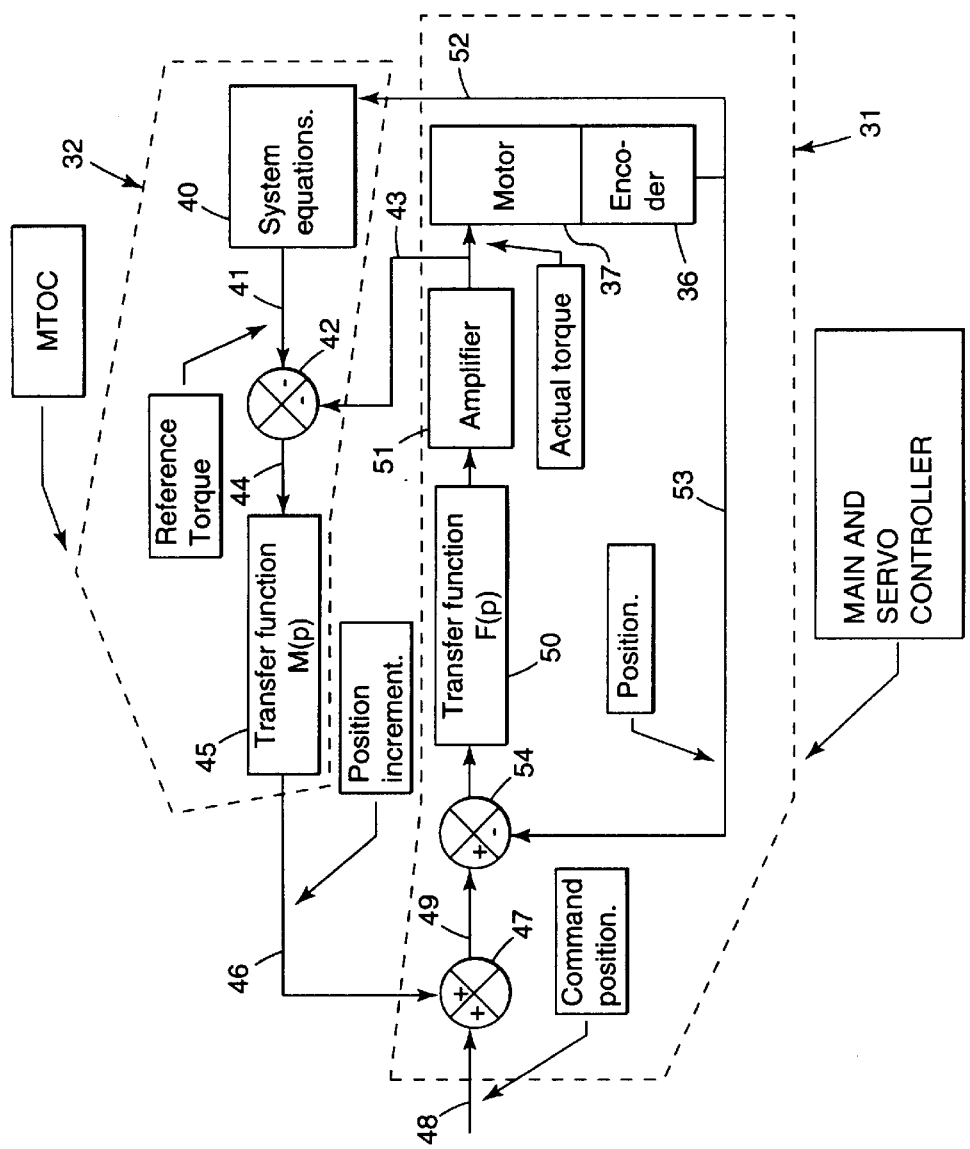
FIG. 3 is a block diagram schematically illustrating the relationship of the Servo Controller (SC) and the Manual Teaching Operation Controller (MTOC) according to an embodiment of the invention.
Figure 4:
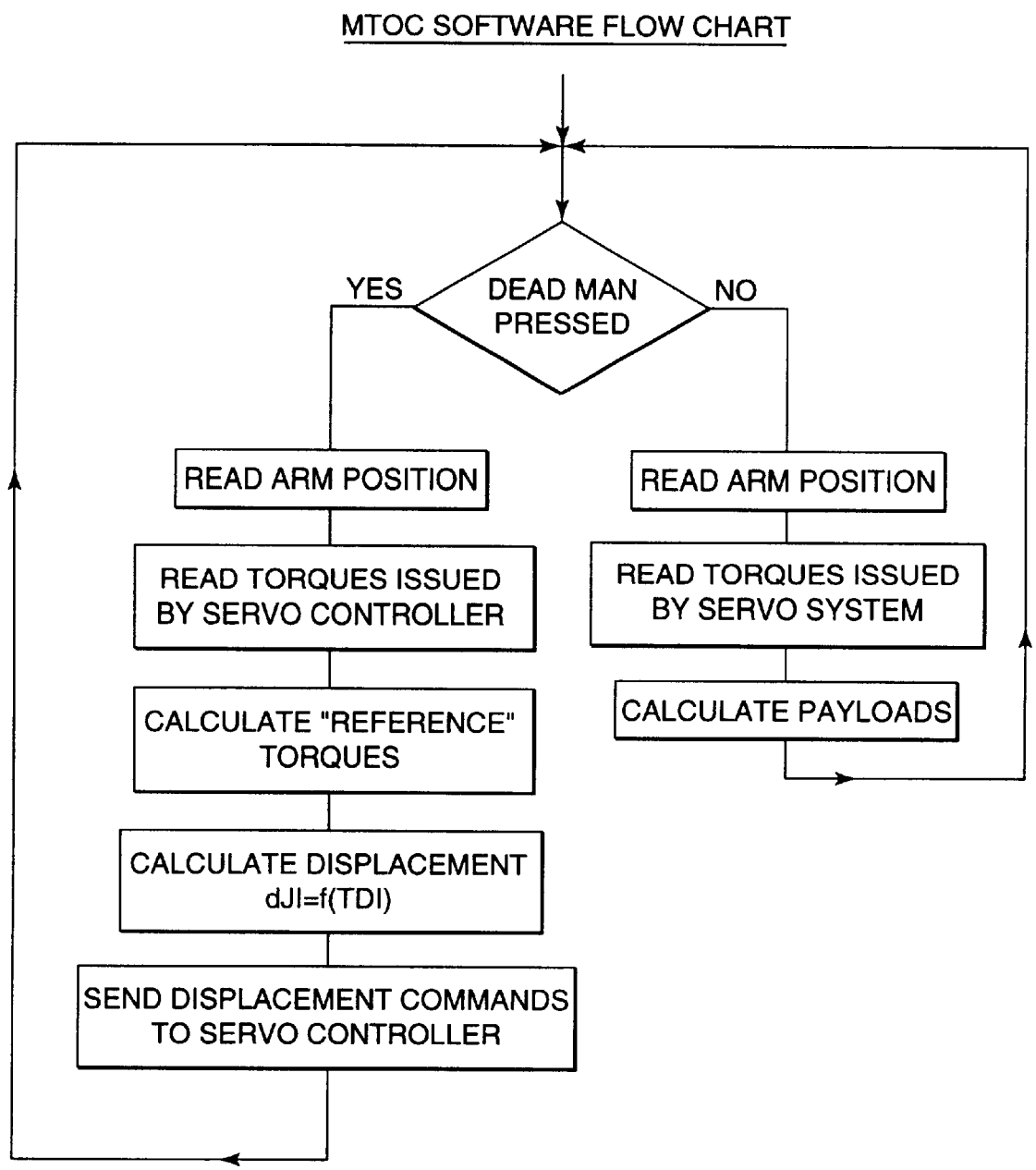
FIG. 4 is an MTOC Software Flow Chart.

FIG. 3 is a block diagram illustrating the relationship between, on the one hand, the Main Controller and the SC, shown in this drawing as a single block, and on the other hand, the MTOC, according to an embodiment of the invention. In the diagram, the Main Controller-SC block and the MTOC are illustrated as separate and interconnected, but, as has been said, they could be integrated into a single unit. Also, the mechanic equations of the system are assumed to be stored in the MTOC, while in standard machines they will be stored in the Main Controller. The operation of the MTOC is summarized by the MTOC Software Flow Chart of FIG. 4, which is self-explanatory. The reference torques, which are stored in the apparatus memory, are transmitted at 41 from the system equations 40 and compared at 42 with the actual torques outputted to the motors by the servo amplifier 51 and transmitted at 43 from the motors. The reference torque value is deduced from position and payload values. Position values are received from the encoder device and payload values have been calculated before beginning the Direct Teach session, as hereinbefore explained. All the calculations are done by using the system equations. Since the reference torque is dependent on position, it is constantly recalculated in order to provide continuously updated values. The resulting difference of the actual and reference torques, which is the displacement torque, indicated at 44, is transformed by a transfer function 45 to a position increment 46, and this, combined at 47 with the existing command position 48, produces a modified command position 49, which is compared with the actual position as read from the encoder 36. The difference is then translated, through transfer function F(p) 50 and amplifier 51, to an actual torque that will move the motor toward the new desired position.

For a given reference configuration, the payloads can be calculated as follows.

The general equation for the torques at motor m will be:

$$T_m = F_m\{j_1 \ldots j_n\} + \Sigma G_{mq} \cdot P_q \quad (1)$$

wherein $P_q$ is the qth payload, q varying from 1 to k; $T_m$ is the torque applied to the mth arm of the system, m varying from 1 to n; $j_n$ are the angles of the joints (pivots) between arms; $F_m$ and $G_{mq}$ are functions that represent the mechanical system, and their form is determined from a mechanical analysis which results in the System Equations as is done in robots according to the prior art.

Since the MTOC continuously receives as input from the SC the actual torques of the system, the k payloads can be calculated, for a given position of the system, by choosing k equations among the n equations (1) (assuming k<n, which implies that the number of payloads is smaller than the number of arms).

The reference torques, viz. the torques in the reference configuration, cam be calculated as follows. When entering the Teach mode, the last value of the payloads is kept. The system can then calculate the reference torques TR by using Equation (1):

$$TR_i = F_i\{j_1 \ldots jn\} + \Sigma G_{iq} \cdot P_q$$

wherein q varies from 1 to k.

The displacement torque TD is the difference between the reference torque TR sensed by the SC and the actual torque TA, calculated as above, and is therefore, in principle:

$$TD_i = TR_i - TA_i$$

However, a low pass filter is applied to that value, so that the real equation is:

$$TD_{i,n+1} = TD_{i,n} + (T_i - TR_i - TD_{i,n})/a;$$

wherein a is an averaging number; $TD_{i,n}$ is the last value calculated and $TD_{i,n+1}$ the next value.

Any kind of low pass filter can be used. The role of the low pass filter is to take into account abrupt changes in actual torque values that can be due either to noise or to operator induced vibrations. Through a low pass filter, as is well known, a variable is replaced by its average value during a given period of time, the length of which corresponds to the degree of smoothing desired.

The command position is changed in the direction of the displacement torque in the following way:

$$J_{i,n+1} = J_{i,n} + dJ_i$$

wherein $J_i$ is the angle between arms i and i+1 and $dJ_i$ is the (positive or negative) increment thereof:

$$dJ_i = -K_{i,1} * TD_{i,n} - K_{i,2} * K_{i,1} * d^2 J_i / dt^2$$

Proportional parameter $K_{i,1}$ defines the speed obtained for a given pressure, viz. the sensitivity of the system to the push forces applied by the operator. Its value is determined empirically, starting from zero and increasing it until a smoothly sensitive behavior of the system is obtained. Parameter $K_{i,2}$ is an acceleration compensation parameter, that is also empirically set. When $K_1$ has too large a value, an oscillating behavior of the arm is observed. Said oscillating behavior can be suppressed by increasing the value of $K_2$. This permits to increase the value of $K_1$ and thus the sensitivity of the system.

The invention has applications in robotics beyond the teaching process. One of them is the manual intervention during a robot work cycle. There are applications where pieces to be manipulated by the robot have changing positions, and the user must teach a reference position at the beginning of some or each cycle (for example, in welding applications). The operator will be able to easily teach the new reference position(s) using the system of the invention by physically moving the robot manually and without effort. In that way, cycle time is reduced, and no special skill is needed for operation.

Further, the invention is useful in robot manual operation for recovery after a failure during working cycle. After such a failure, it is very common that recovery is done by manual operation; very often, the robot work cycle cannot be restarted from the position where the failure occurred, and manual operation is required to pull out the robot from the abnormal position. This manual operation is usually delicate, because failure mainly occurs when the robot is inside the most delicate area of the application. Most conventional robots use manual "Teach Pendant" in order to drive manually the robot back to a safe starting position. However, that manual operation is very tedious, because when using "Teach Pendant", the robot can be moved only along one axis at a time, i.e., only one actuator is moved at a time, or motion along one Cartesian axis only is effected at a time. Thus, the operator must frequently change the axis of movement in order to follow a strait path. Also, sometimes the robot must be moved along a specific direction that cannot be commanded using the "Teach Pendant" (for example, disengaging a screw which is not in the direction of the tool).

When using the system described in this patent application, the operator can move the robot in either direction, in an intuitive way, as if he were moving the arm without weight in a viscous fluid. The resulting movement may imply any combination of all axes of the robot.

Apart from the applications in robotics, the invention is useful in the operation of automatic machinery with servo control, for teaching positions, and for manual operation of an automatic system for loading, unloading, recovery after operation failure, system set-up, manual intervention during the work cycle, and so on.

All the above mentioned operations are in reality non-routine teaching processes and the invention is applicable to them without any change. Servo Controllers are well known in the art: reference can be made, e.g., to "D.C. Motors Speed Controls. Servo Systems" by Electrocraft Corp.

While specific embodiments of the invention have been described by way of illustration, it will be understood that they are not limitative and that the invention may be carried into practice with many modifications, variations and adaptations, without departing from its spirit or exceeding the scope of the claims.

What is claimed is:

1. Method for the direct teaching of automatic machinery systems, comprising a plurality of arms (11, 12, 13) and of corresponding actuators for equilibrating the arms against payloads (14) and displacing them to operative positions, when desired, which comprises, placing the system in the Teach mode when it is wished to carry out the teaching and applying an external force in the direction desired for the purpose of the teaching, characterized in that it further comprises the steps of:

a—placing the system in a reference configuration and memorizing for each arm the reference torque to be produced by the corresponding motor to maintain the arm in its reference position;

b—for each arm, determining the actual torque required to maintain the arm in its reference position in spite of the application of said operator force;

c—calculating a displacement torque as the difference between said reference and said actual torque;

d—causing the motor to displace the arm in the direction of said displacement torque and by an amount proportional to it;

e—repeating the above operations c- to d- by the successive application of external forces, until the position of the arm, that it is desired to teach, has been reached; and f—memorizing the teach position thus reached.

2. Method according to claim 1, wherein the automatic system is a robot.

3. Method according to claim 2, wherein the aim is the manipulator arm.

4. Method according to claim 1, comprising providing a Manual Teaching Operation Controller (25,32), causing said controller to sense any change in the torque applied to each motor, to translate said change to a proportional displacement, and to send to the automatic machinery system Main Controller (30) a command to activate a new command position which is different from the previous command position by the said displacement.

5. Method according to claim 4, comprising causing the Manual Teaching Operation Controller (25,32) continuously to calculate the payloads applied to the system.

6. Method according to claim 4, comprising causing the Manual Teaching Operation Controller (25, 32) to memorize the last values of the payloads, which has been calculated before the Teach mode is started, as reference values of the payloads.

7. Method according to claim 1, wherein the external forces are applied manually.

8. Apparatus for the direct teaching of automatic machinery systems, comprising a plurality of arms (11, 12, 13), of corresponding actuators for equilibrating the arms against payloads (14) and displacing them to operative positions, when desired, comprising means for feeding current to the actuators, and further comprising a Main Controller (30) and a Servo Controller (31) for controlling the actuators output as a function of payloads, characterized in that it additionally comprises means (23) for placing the system in a Teach mode and a Manual Teaching and Operating Control (25, 32), which comprises means for reading from the system memory the reference torque required for each arm to maintain it in its reference position, means for receiving from the Servo Controller, when an external force is applied to the arm, the value the actual torque required to maintain the arm in its reference position in spite of said force, means for calculating the displacement torque as the difference between said reference and said actual torque and a displacement proportional to and having the direction of said displacement torque, means for requesting from the Main Controller a new command position differing from the previously existing one by said displacement, and means for registering in the system memory the position reached as a result of said new command.

9. Apparatus according to claim 8, further comprising memory means for memorizing the position of the arm that it is desired to teach.

10. Apparatus according to claim 8, wherein the automatic system is a robot.

11. Apparatus according to claim 8, wherein the Manual Teaching and Operating Control (25, 32) is included in the Servo Controller (31).

12. Apparatus according to claim 8, wherein the Manual Teaching and Operating Control (25,32) is external to the Servo Controller and interfaced with it.

* * * * *